United States Patent [19]
Boelens

[11] 3,974,201
[45] Aug. 10, 1976

[54] METHYL-N-(2-METHYL-PENTYLIDENE)-ANTHRANILATE FOR PERFUME AND FLAVORING COMPOSITIONS

[75] Inventor: Harmannus Boelens, Huizen, Netherlands

[73] Assignee: Naarden International, N.V., Naarden-Bussum, Netherlands

[22] Filed: Mar. 8, 1973

[21] Appl. No.: 339,374

[52] U.S. Cl............................ 260/471 R; 252/522; 426/534
[51] Int. Cl.$^2$................................ C07C 101/54
[58] Field of Search ............................ 260/471 R

[56] References Cited
UNITED STATES PATENTS
3,555,003   1/1971   Ribka............................ 260/471 R

OTHER PUBLICATIONS

Arctander, Perfume and Flavor Chemicals (1549, 2135), (1969).

*Primary Examiner*—Robert Gerstl
*Attorney, Agent, or Firm*—Stevens, Davis, Miller & Mosher

[57] ABSTRACT

A perfumed material containing methyl-N-(2-methylpentylidene) anthranilate prepared by incorporating methyl-N-(2-methylpentylidene) anthranilate into mixtures usual for such purpose to impart a citrus like note thereto.

1 Claim, 1 Drawing Figure

I.
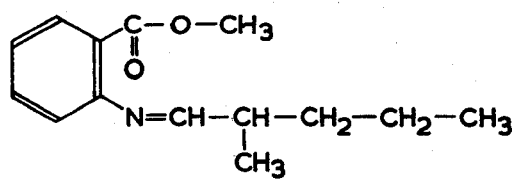
FIG.1
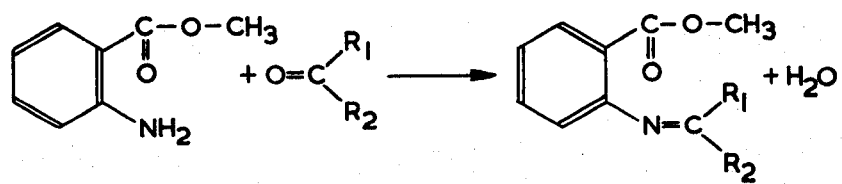

METHYL-N-(2-METHYL-PENTYLIDENE)-ANTHRANILATE FOR PERFUME AND FLAVORING COMPOSITIONS

The invention relates to a process of preparing perfume and flavouring compositions by incorporating an N-alkylidene anthranilate in mixtures usual for these purposes.

In the literature many so-called Schiff's bases of methylanthranilate and carbonyl compounds are described. Thus F. V. Wells (American Perfumer 52 (1948), 218–220) mentions the preparation, the colour and the perfume properties of the condensation products of methyl anthranilate with 15 carbonyl compounds. According to Wells the preparation comes down to simply mixing the heating of equimolecular amounts of methyl anthranilate and carbonyl compound and removing the water formed, all this according to the reaction of FIG. 1.

A purification of the reaction product does not take place.

In the book by S. Arctander (Perfume and Flavor Chemicals, Montclair, 1969) a total of 23 Schiff's bases are discussed (Monographs No. 26, 157, 244, 624, 655, 665, 755, 759, 836, 1549, 1621, 1734, 1735, 1782, 1733, 1799, 1955, 2080, 2125, 2135, 2253, 2280 and 3070).

Arctander refers repeatedly to the phenomenon that with these products the odour depends strongly on the method of preparation and in particular on the ratio of the reactants used. A small excess of aldehyde or ketone gives in the final product a clear deviation of the odour, whereas the odour of a small excess of methyl anthranilate can also be observed very well in the final product. Consequently these substances, as Arctander remarks, have often a typical characteristic odour, dependent on the process carried out by the manufacturer. This is caused by the fact that none of these products is purified, e.g. by distillation or crystallisation because thereby the desired odorous properties get lost. It is also questionable to what degree these substances, in view of their often high molecular weight, might be purified by distillation without decomposition phenomena. It is even doubtful whether many of the known Schiff's bases will in a pure condition have any odour at all and whether the value as perfume is not caused in fact by the presence of impurities or by the combined perfume effect of the raw materials still being present. As an example the condensation product of methyl anthranilate with α-amylcinnamaldehyde (Arctander, l.c. Monograph No. 157) may be referred to here. The molecular weight amounts to 335.45. As a pure product this compound very likely, will have no odour, because compounds having a molecular weight higher than about 300 have no odour (Stoll, Molecular Structure and Organoleptic quality, S.C.I. Monograph No. 1, London, 1957, pages 1–12).

It has now been found that the new compound methyl-N-(2-methylpentylidene) anthranilate of the formula 1 can be distilled very well. A pure product is obtained as a clear, yellow liquid having a strong citrus odour lasting very long, reminding of grapefruit and mandarin and being totally free from the penetrating and persistent odours of methyl anthranilate and 2-methylpentanal. The compound can be advantageously used both in perfume and in flavouring compositions to impart or reinforce a citrus-like note or for improving the natural touch in fruit essences. The compositions can be used for the manufacture of perfumed articles and for flavouring foodstuffs, drinks and the like.

The preparation of the compound is carried out in a manner known per se for analogous compounds.

EXAMPLE I

Preparation of methyl-N-(2-methylpentylidene)anthranilate.

226.5 g (= 1.5 g mole) of methyl anthranilate, 150 g (= 1.5 g mole) of 2-methylpentanal and 400 g of toluene are brought into a 2 liter reaction flask. Then the mixture is agitated under reflux for about 5 hours at a bottom temperature of 100°–120°C, 20 g of water being taken off through the reflux head. Then the solution is concentrated at a 30 cm Vigreux column under reduced pressure (about 20 mm Hg) to a bottom temperature of 110°C. 360 g of toluene are obtained and 347 g of evaporation-residue. The evaporation residue is fractionated at a 30 cm Vigreux column to obtain:

76,4 g of first runnings, boiling point 130°C/0.5 mm Hg, $n_D^{20}$ 1.5837; 258 g of methyl-N-(2-methylpentylidene) anthranilate, boiling point 138°–142°C/0.5 mm Hg, $n_D^{20}$ 1.5826; 10 g of residue. Yield 258 g = 73.8% of the theoretical yield.

The usefulness of methyl-N-(2-methylpentylidene) anthranilate in perfume compositions can be illustrated by the following examples:

EXAMPLE II

Perfume composition lemon

| Component | Parts by weight |
|---|---|
| Decanalmonodecylacetal | 10 |
| 2-ethoxynaphthalene | 5 |
| 2-acetyl naphthalene | 10 |
| elemi resinoid | 70 |
| linalyl acetate | 200 |
| linalol | 100 |
| terpineol | 50 |
| geraniol | 20 |
| citronellol | 20 |
| lemon oil | 470 |
| citral | 10 |
| iso-cyclocitral, 10% in diethyl phthalate | 25 |
| methyl-N-(2-methylpentylidene)anthranilate | 10 |
| | 1000 |

EXAMPLE III

Perfume composition Cologne

| Component | Parts by weight |
|---|---|
| Musk R1 (registered trade mark) | 20 |
| Decanal monodecylacetal | 10 |
| linalol | 200 |
| galbanum resinoid | 20 |
| linalyl acetate | 100 |
| lemon oil | 200 |
| petit-grain oil | 100 |
| bergamot oil | 240 |
| 6-acetyl cedrene | 50 |
| eugenol | 20 |
| angelica root oil, 10% in diethyl phthalate | 20 |
| methyl-N-(2-methylpentylidene)anthranilate, 10% in diethyl phthalate | 20 |
| | 1000 |

In various flavouring compositions and essential oils metyl-N-(2-methylpentylidene)anthranilate can also be used advantageously. Thus the character of grapefruit oil is improved by the addition of only 1 ppm, whereas the addition of 5 parts by weight of methyl-N-(2-methyl-pentylidene)anthranilate to 100 parts by weight of orange oil gives an oil having the odour and flavour of grape-fruit.

In various essences a beautiful natural character is obtained by the addition of methyl-N-(2-methylpentylidene)anthranilate as is apparent from the following examples:

Example IV.

Guava essence

| Component | Parts by weight |
|---|---|
| Grape-fruit washing | 700 |
| limette washing | 200 |
| benzaldehyde | 10 |
| isobutyl acetate | 10 |
| gamma-undecalactone | 10 |
| 3-methylbutyl-thio-ethyl formiate | 3 |
| methyl-N-(2-methylpentylidene)anthranilate | 1,6 |
| ethanol | 65,4 |
| | 1000 |

EXAMPLE V

Grape essence

| Component | Parts by weight |
|---|---|
| ethyl butyrate | 0,5 |
| methyl anthranilate | 2,0 |
| ethyl anthranilate | 2,0 |
| ethyl vanillin | 3,0 |
| geraniol | 0,1 |
| methyl-N-(2-methylpentylidene)anthranilate | 1,2 |
| ethanol | 991,2 |
| | 1000 |

What we claim is:
1. Methyl-N-(2-methylpentylidene)anthranilate.

* * * * *